US006473137B1

(12) United States Patent
Godwin et al.

(10) Patent No.: US 6,473,137 B1
(45) Date of Patent: Oct. 29, 2002

(54) METHOD AND APPARATUS FOR AUDIO-VISUAL CUES IMPROVING PERCEIVED ACQUISITION TIME

(75) Inventors: John P. Godwin, Los Angeles, CA (US); Robert H. Plummer, Seattle, WA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/606,381

(22) Filed: Jun. 28, 2000

(51) Int. Cl.$^7$ ................................................ H04N 5/44
(52) U.S. Cl. ........................ 348/725; 348/731; 348/732; 725/131
(58) Field of Search ................................ 348/731, 732, 348/725, 726, 563, 564, 569, 570, 559, 388; 725/131, 139, 151; H04N 5/445, 5/50, 5/44, 7/173

(56) References Cited

U.S. PATENT DOCUMENTS 5,452,023 A * 9/1995 Kim ............................ 348/731
5,786,845 A * 7/1998 Tsuria ............................ 348/9
5,933,192 A * 8/1999 Crosby et al. ............... 348/731
6,115,080 A * 9/2000 Reitmeier .................... 348/731
6,118,498 A * 9/2000 Reitmeier .................... 348/725
6,188,448 B1 * 2/2001 Pauley et al. ................ 348/731
6,212,680 B1 * 4/2001 Tsinberg et al. .............. 725/39

* cited by examiner

Primary Examiner—John Miller
Assistant Examiner—Trang U. Tran
(74) Attorney, Agent, or Firm—John A. Crook; Michael W. Sales

(57) ABSTRACT

A method and apparatus for perceptibly masking acquisition time in a digital broadcast system transmitting programs on multiple channels is incorporated in a receiver for the information signal transmission system. The apparatus and the method generate a reduced time response, independent of the acquisition time for complete video images, and provide an output for portraying a masking display from the receiver before the acquisition time has expired. A generator and the output display are easily employed with known video transmission systems by suing a microcontroller switch to select channels and retrieve audio or visual cues in response to an output response less than that necessary for communicating the entire program image.

4 Claims, 4 Drawing Sheets

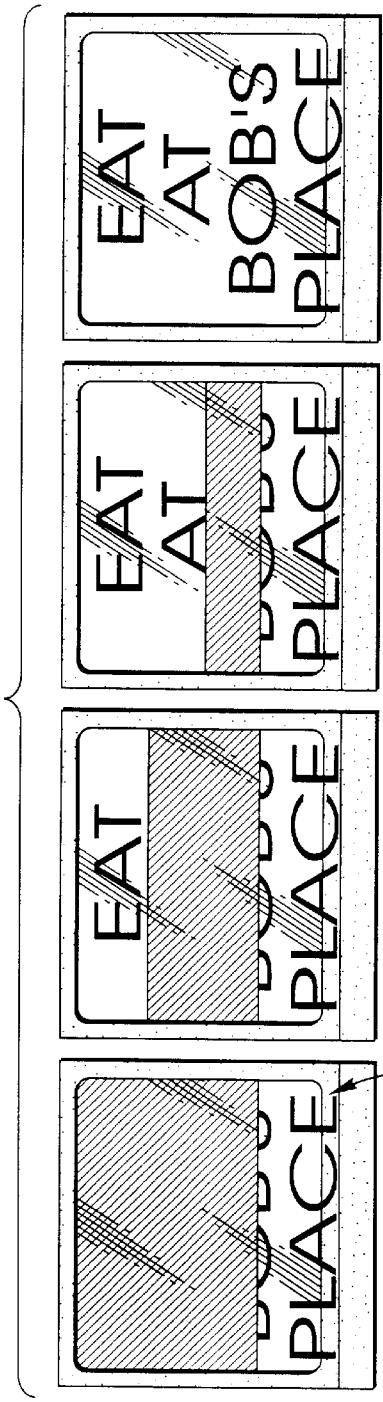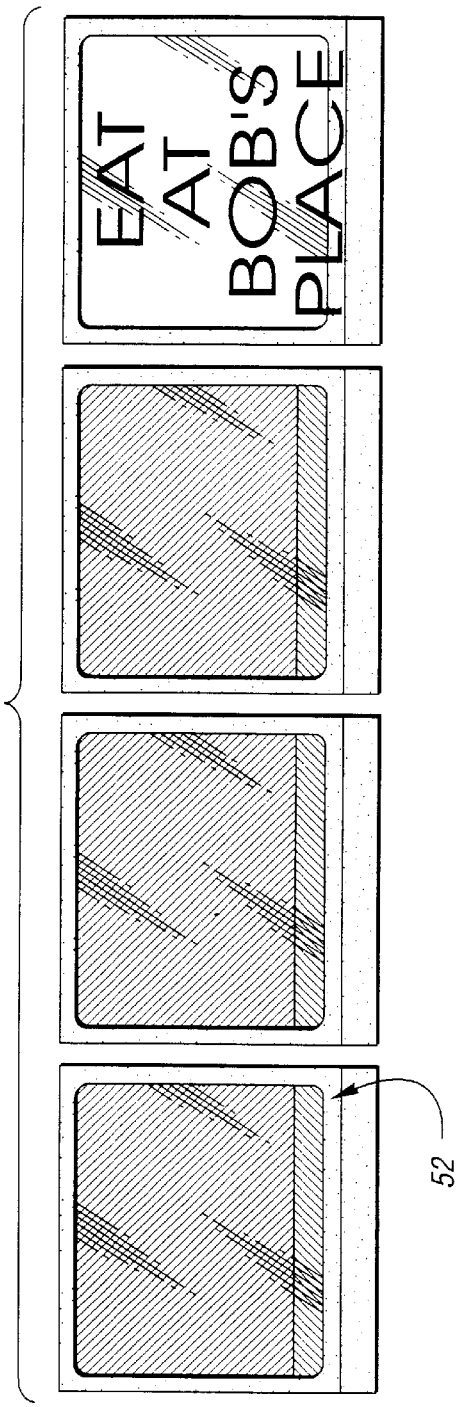

METHOD AND APPARATUS FOR AUDIO-VISUAL CUES IMPROVING PERCEIVED ACQUISITION TIME

TECHNICAL FIELD

The invention relates to methods and apparatus for receiving and processing multi-channel digital video transmissions such as a digital satellite broadcast receiver that provides quicker perceived response to a user's command to change channels.

BACKGROUND ART

The time required for a conventional multi-channel digital video receiver, such as a direct broadcast satellite (DBS) receiver, to change channels is comparatively greater than the time needed to change channels in a conventional analog system such as an over-the-air television system. In either system, reception processing for a selected broadcast channel requires a tuner to tune to the desired carrier frequency and output the desired programming to an output device such as a video-audio display.

Reception of a digital broadcast typically requires additional process steps. High capacity systems typically utilize signal compression techniques, such as MPEG2 (Moving Pictures Expert Group Standard 2) encoding, as well as effective error correction coding. To receive and process these signals, most digital receivers adjust for the appropriate polarity and frequency of the received satellite transmission, filter and select the required data packets corresponding to the desired broadcast channel selected, and demodulate the channel data including the program and other content. Most digital systems further enable and lock error-correction circuitry into the new channel before transporting the resulting data packets to a digital decoder. For example, in decoding the video data packets in an MPEG stream, the next complete video frame (I-frame) is generally input to memory buffers before video images are re-encoded to an analog signal for display on the user's screen.

In a high-capacity, multiple-channel digital video system, conventional receivers may therefor require several tenths of a second, for example, from 0.3 to more than 1 second, to change channels.

These delays may be perceived by viewers, particularly viewers acclimated to the more immediate response in analog television systems, and may be particularly annoying to a viewer that is sequentially scrolling through adjacent channels, an operation that many users like to perform quickly.

In light of the numerous processes being performed, the improvements in processing time have previously been obtained only with substantial effort and expenditures to improve the processing time for each of the required processes. However, given the nature of MPEG 2 or similar predictive or bidirectional predictive compression techniques, there are limits on the ability to reduce worst-case acquisition times. Another attempt to reduce the perceived time response utilizes multiple tuners so that channel selection may be made by switching to the output of another tuner that has been previously tuned to a second broadcast channel. However, using additional tuners reduces processing time only to the extent that the desire channel corresponds, predictably, with the selection of those channels that are pre-tuned. Accordingly, multiple redundant tuners may be required when quick sequential scanning of the selected channels and their program content is desired.

In addition, multiple tuner receivers do not reduce perceived acquisition time when channel changes do not correspond to a predicted, pre-tuned channel.

DISCLOSURE OF INVENTION

A multi-channel digital video receiver and the method that are the subject of this invention provide significantly quicker perceived response to channel changes.

In general, the receiver includes a tuning unit with a tuner module and a decoder unit, although the invention may also be adopted with a multiple tuner receiver to overcome problems discussed above. The receiver practices a method for perceptibly masking acquisition time after selection, by the user, of an alternative signal source. The receiver generates an output for portraying a masking display, either video, audio or both, before the acquisition and processing time has expired.

In a preferred embodiment, a reduced perceived time response is generated by transmitting a simple trigger signal at smaller intervals than the acquisition time period. Such triggering may be transmitted from the signal broadcast location or may be accomplished by locally identifying a source selector change and triggering an image portrayal from a local storage device in response to said identification of source selection change. Triggering may also comprise generating a spoof signal simulating an acquisition complete signal.

As a result, the present invention provides improved perceived response to channel selection changes without the complex and expensive improvements needed to improve actual acquisition time. Moreover, the system is substantially less expensive than, and can be used to supplement and improve the operation of, previously known multiple channel receivers.

The above objects and other objects, features, and advantages of the present invention will be readily appreciated by one of ordinary skill in the art from the following detailed description of the best mode for carrying out the invention when taken in connection with the accompanying drawings.

BRIEF DESCRIPTION OF DRAWINGS

FIG. 4 is a front view of a video display resulting from the use of a data signal as shown in FIG. 3 output from the receiver of FIG. 1.

DETAILED DESCRIPTION OF PREFERRED EMBODIMENT

Figure 1:
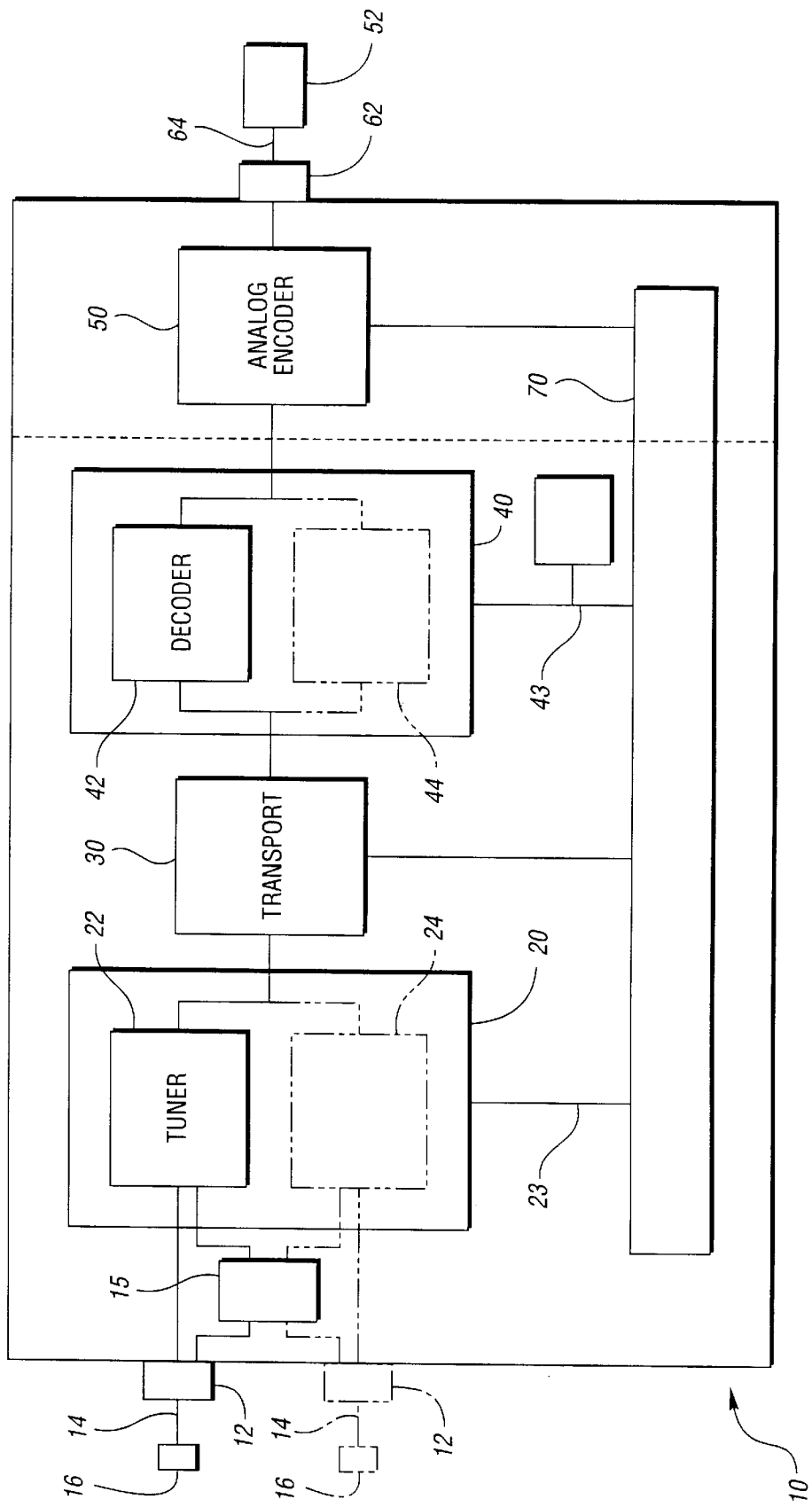
FIG. 1 is a diagrammatic view of the receiver constructed in accordance with the present invention.

FIG. 1 illustrates a preferred embodiment of a receiver according to the present invention comprising, for example, a DBS receiver 10 used to process a DBS broadcast transmission. The DBS broadcast transmission, for example, a Ku band signal including audio and video information for a range of DBS channels, is received by a satellite antenna 16 and fed to the receiver 10 through a suitable DBS input 12.

Although additional tuners may be employed as shown in phantom line in FIG. 1, only one tuner is necessary. Each DBS input 12 is preferably a standard RF input that can be readily connected to a coaxial cable 14 from the antenna 16 to receive a signal, for example, an L-band intermediate signal from low noise block converters (LNBs) located at the antenna. Other transmission or distribution systems may similarly be used, for example, other direct-to-home broadcast, digital terrestrial broadcast, or cable transmission, without departing from the scope of the present invention.

The DBS broadcast transmission inputted through the DBS input 12 is sent to a tuning module 20 comprising at least one tuner module 20, or a plurality of tuner modules as shown in phantom line in FIG. 1. The tuner 20 tunes and demodulates at least a portion of the transmission to produce a set of DBS channel data packets for the selected channel. If two L-band inputs are used so that two receivers may be independently connected to separate circuitry in a dual LNB outdoor unit, each receiver independently selects by known techniques (such as use of variable voltage, e.g., 13- or 18-volt dc, tones, or other signals) either, e.g., left-hand circular polarization (LHCP) signals or right-hand circular polarization (RHCP) signals, as required by the channel to be tuned. In systems where two cables are not sufficient (e.g., where multiple satellites having different locations or frequency bands are utilized) additional cables 14 or other interconnects may be required.

In a system where the RHCP and LHCP transmissions are each delivered to the receiver through separate interconnects (for example, separate coaxial cable 14) into a suitable selector switch or multiswitch 15 associated with each tuner module, each tuner module 22 sends a signal, such as a 13- or 18-volt signal, which its associated switch interprets as a request for either the first or second (or other) signal set (e.g., RHCP or the LHCP signal containing the desired channel). The switch acts upon the signal by connecting the tuner module to the appropriate DBS input having the desired signal set. Using a switch with each tuner module 22 allows the receiver 10 to include three or more tuner modules 22 without the need for additional coaxial lines from the receiver to one or more LNBs, and allows use of multiple receivers at a location in conjunction with a single antenna system.

Preferably, each tuner module 20 includes a QPSK (quaternary phase shift keying), 8 PSK (8 phase shift keying), QAM (quadrature amplitude modulation) or other demodulator circuit for demodulating the broadcast. Such demodulators are in widespread use in the U.S. in receivers adapted to commercial DBS systems. It is also preferable that each tuner module includes a forward error correction circuit to correct channel coding errors. The use of such circuitry is also well-known in the U.S.

The tuning unit 20 outputs DBS channel data packets to a transport circuit 30. In the transport circuit 30, the data packets are filtered based on their identifying headers for further processing. Filtering can include, for example, selecting the required data packets in a multiplexed data stream corresponding to the desired channel, and sending the data packets of the tuned channels to a conditional access module to assure that access to the content is authorized. The audio, video, and data packets are segregated. Steering is based on header information. While the illustrated transport circuit 30 functions the same as a transport circuit in a conventional DBS processor, it preferably has additional capacity of filters that process two video bit streams and multiple audio bit streams for example, to handle the additional data packets produced for a second DBS channel when two tuners are employed. Alternatively, two or more transport circuits 30 may be utilized.

The filtered data packets are sent through the transport circuit 30 to a digital video and audio decoding unit 40. The decoding unit 40 preferably includes at least one decoder module 42 for each tuner module 22, so that decoder module 42 decodes the filtered data packets for one of the tuned DBS channels to provide decoded video, audio, and/or data signals for that tuned channel. The decoder module 42 in the preferred embodiment handles all tuned channels. Preferably, the decoder module 42 includes audio, video, and/or data decoders, and decodes the filtered signals in accordance with the MPEG or other applicable standard such as DIRECTV broadcast standards based on MPEG2 standards.

In a preferred embodiment, decoded video, audio, and/or data signals are output from the decoding unit 40 to an output stage, such as an analog encoder 50. The encoder 50 processes the decoded signals to produce an appropriate signal for output to a presentation device 52, such as a television set, or other combination of video monitor, audio processor, data processor, etc. In certain embodiments, analog video encoding is done by a conventional NTSC (National Television Standards Committee of the Electronic Industries Association (EIA)) encoder. In an all-digital television system, of course, such analog video encoding would be unnecessary. The output signal may be outputted through an output jack 62, such as a conventional RF, S-video, SVGA, RGB, $YP_bP_r$, or other format of analog or digital output, which can be connected to the presentation device 52 by, for example, a conventional cable 64. The presentation device 52 may be an analog television, digital television, computer monitor or other audio/visual display device.

Digital television systems, such as the MPEG2-based system used by DIRECTV, Inc., utilize sophisticated signal processing of the original video and audio to compress the digital data stream into a format which is efficient for transmission or storage. The viewer uses a complex decoder, data buffers and frame store to reconstruct the original is image. For a typical MPEG2-based system, the time related to the MPEG2 bit stream acquisition and synchronization will be roughly 0.5 seconds as an average. In a typical DBS system, with multiple MPEG2 channels broadcast over multiple satellite transponders, the average total acquisition time perceived by a viewer may be approximately one second. The total perceived acquisition time (TPAT) consists of three primary components as follows:

Front-end, tuner/demodulator/error control decoder, acquisition

Conditional access or decryption acquisition

MPEG2 video and audio acquisition

The TPAT of one second for such a system is clearly perceptively greater than the approximately 300–400 milliseconds acquisition time provided by existing analog television VHF/UHF tuners. Any multi-channel pay television system will have similar acquisition processes, although perhaps with shorter or longer times for each constituent part. Any digital television system using the MPEG2 standard, with an efficient set of encoding parameters, will have an acquisition time, due to the MPEG-related portion alone of perhaps 400 ms, average. The present invention provides a perceived improvement in response to the user independent of the acquisition time.

Reducing the TPAT can provide competitively significant improvements in these digital television transmission system. The innovative approaches described herein utilize a standard MPEG2 system (or similar digital encoding system), in some cases with specially selected parameters, plus external audio-visual cues to improve the average perceived response independent of acquisition time. Fundamental improvements in acquisition are not described but may accompany the use of the present invention.

The examples described herein are for digital transmission applications. However, the innovations also apply to access to e.g. recorded content (remote or local), such as Near Video On Demand (NVOD) storage retrieval systems when the viewer requests retrieval at an arbitrary point with respect to the MPEG stream's I-frame structure.

The perceptual improvements of the preferred embodiment recognize that prior MPEG2 television systems and the like have displayed video, and then audio, only after acquisition of a full I-frame. Certain digital television receivers mute the audio, even though it may have been acquired, until a full I-frame of video is decoded and available in the frame store. Audio bit-streams have a simpler frame structure and a much lower data rate than video bit-streams. The audio bit-streams can be made available sooner than the video either by "spoofing" current digital receivers into concluding that video is available or by improving the design of new receivers. Audio cues can then be used to convince the viewer that acquisition has occurred or is expected momentarily. Prestored video cues are also part of the innovations described below.

The first embodiment developed by the inventor(s) to improve TPAT was in support of the desire to transmit still-frame "video slides". These slides were informative graphics displayed with no or little motion even though the underlaying digital television system permitted full motion video. These video still-frames can be encoded very efficiently using the MPEG syntax by simply increasing the time between I-frames, for example, by increasing the size of each group of pictures (GOP). However, this increase then proportionally increases the TPAT unless innovative measure are employed. This first embodiment was also developed under conditions that assumed that only the normal audio channel(s) were available for audio cues. The present invention is particularly beneficial when it is desired to transmit such slides, for example, in a DBS system since substantial bandwidth reduction may be realized by increasing the size of GOPs.

Figure 2A:
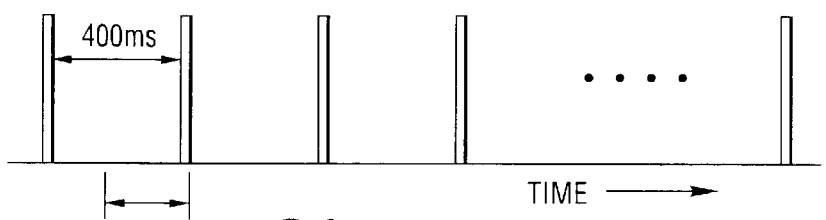
FIG. 2 is a graphic representation of data signals employed in the transmission system using a receiver as shown in FIG. 1.
Figure 2B:
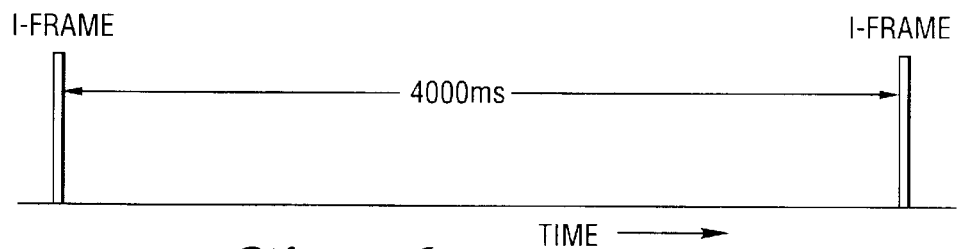
Figure 2C:
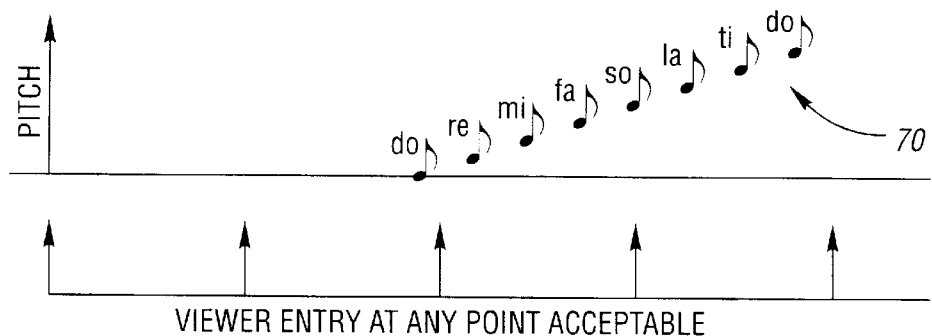
Figure 3A:
FIG. 3 is a graphical representation of the modification of signal data that may be employed in the transmission system using the receiver of FIG. 1.
Figure 3B:
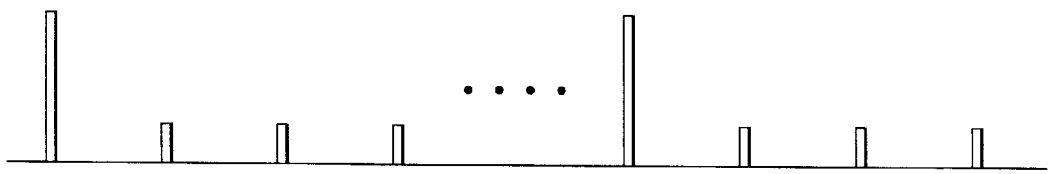

When receivers "present" audio prior to video, then audio cues can be used between I-frames to indicate "anticipation" of the video to come or to simply "calm" the viewer and encourage their patience. These cues can include tones rising in pitch or intensity, such as simply an octave run of "do, re, me, fa, so, la, ti, do," as shown in FIG. 2C. Other cues could include brief musical passages specifically written for this purpose, or musical passages already familiar to the television viewer. Preferably, these audio cues are chosen so that they make sense to the listener if entered at any point along the passage and sent from the transmitter or injected (e.g. from local storage) at the receiver. In the preferred digital television systems of interest, the viewer may tune into a channel at any point with respect to the periodic I-frames. This is illustrated in FIG. 2 with an octave run 70 used to create anticipation on the part of the viewer. If the viewer tunes in at any note in the run, the run will still make musical sense and give the same effect. On the other hand, the famous initial passage of Beethoven's Fifth Symphony provides great anticipation if heard in its entirety, but it may not be perceived as a complete musical phase if entered at an arbitrary point. Examples of audio cues with preferred properties include increasing (or decreasing) tones or scales in pitch or volume, and may be music or sound effects, preferably with the above characteristics. A specific thematic example to introduce a video frame with sport scores may be audio consisting of a ticking clock increasing in volume followed by a whistle.

Cues may also be calming and applied even when shorter times elapse between I-frames or when a viewer is expected to view video for a long period. Examples include: new age music, nature sound effects, and other background music. Multiple cues may be selected sequentially.

In another embodiment where receivers mute the audio until video is available, the receivers may be tricked or spoofed into presenting audio or video cues by sending specially coded video information to the display. In efficiently transmitting still-frame video, FIG. 4 illustrates sending or storing syntactically-complete I-frames, per the MPEG standard, but I-frames where each one actually represents only a portion of the full television frame. The frame store in memory 48 of the receiver would build up a complete television frame by assembling these partial frames. During acquisition, the viewer would see a single partial frame and then each successive partial frame would be painted, and added, onto the screen. Preferably, after the first partial frame is displayed, the viewer would hear the anticipatory audio cues described above and be alerted to wait for the remainder of the frame. FIG. 4a illustrates a case where the complete frame is painted from top to bottom, but a viewer might tune in when the bottom portion is being displayed and then see that plus the portion at the top of the frame. This is not objectionable in cases where the text or graphics being presented can itself be segmented into the same partial frames as used in the technical design. FIG. 4b illustrates sending very small I-frames, consisting only of a few video lines, which would be effectively not visible to the viewer, and then periodic major I-frames containing the program material.

Figure 5:
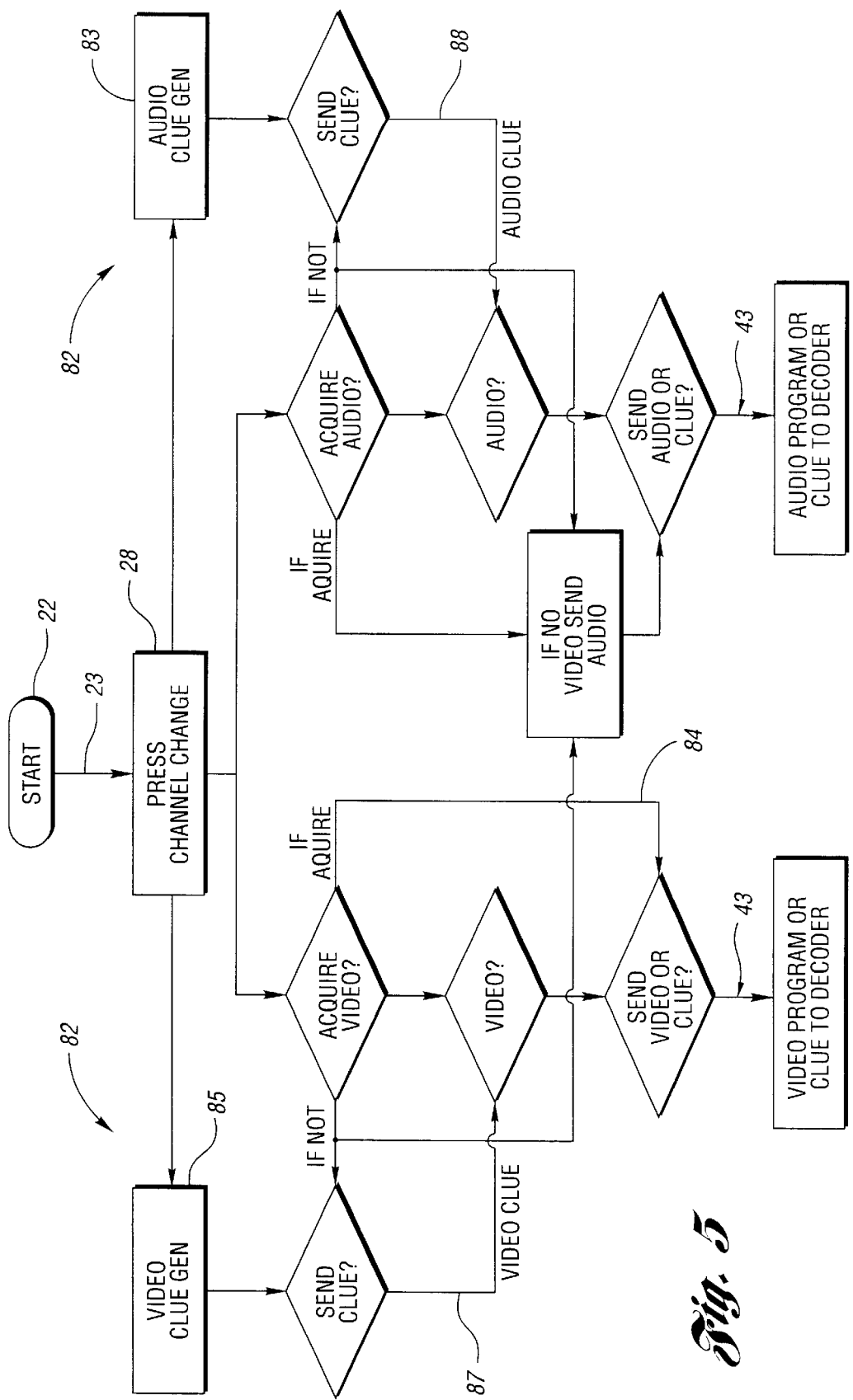
FIG. 5 is a block diagram of program functions used to practice an embodiment of the invention.

As shown in FIG. 5, a preferred routine combining separate but parallel paths for audio and video is illustrated for demonstrating the processing of the invention conveniently. When the channel selector is operated by the viewer, the microcontroller 70 has a local trigger that enables a cue generator 82. In the preferred embodiment, both an audio cue generator 83 and a video generator 85 may be separately or jointly activated. If the microcontroller 70 detects acquisition of a complete video I-frame in an interval substantially less than the period between I-frames, the video frames are sent as shown at 84 to the decoder for receiver output. If the interval passes before the I-frame is received, a spoofing or masking signal in the form of a video cue 87 or audio 88 or both cue are sent, as shown at 86.

In a new design, the TPAT for all types of video material can be improved by the following innovative changes with respect to existing systems. In certain applications of the invention, the I-frame repetitions are preferably synchronized across all video streams. This constraint may reduce encoding efficiency but permit improvements in total perceived acquisition time. Video or audio cues may be stored in the receivers, and may include generic material, video or audio material, or a small pre-stored video frame with the network or sponsor logo and/or a sample note pattern. The transmit data stream may contain secondary identifiers to indicate which stored cue for the microprocessor to retrieve from memory for output. Also, a secondary audio channel may be used with each video channel which provided the audio cue material.

In a system with I-frame synchronization across all channels then when the viewer is watching one television channel and tunes to another, the receiver predicts the time until the next I-frame acquisition. The receiver also determines, based on the system characteristics and desired TPAT, the best strategy on use of audio-visual cues. If an I-frame was just decoded on the previous channel, the receiver calculates that an excessive time will elapse before the next I-frame. The receiver logic will then, for example, invoke one or more of the audio-visual anticipatory cues available in that implementation. If the time to the next I-frame is predicted to be very short, then the cues may not be used. If one of the audio-visual cues is used, the normal program material is automatically joined as it becomes available.

In developing a particular realization of the innovations, the designer will consider viewer expectations and other applications issues. If the viewer is familiar with analog tuning times of 300–400 ms, then that time may be considered acceptable. If the viewer is familiar with computers and electronic games, sequences of notes and tones may be a quite natural introduction to their broadcast television material.

The various cue types could be operationally invoked by the receiver logic alone, by broadcaster command, or by a combination of receiver logic and broadcaster command. Additionally, the system may be designed so that the viewer could have the ability to enable or disable the TPAT improvement cues. Since the audio-visual cues themselves do not need to be protected by encryption, their display time will be improved, relative to other material, because cryptographic synchronization is not required. In addition, when the audio-visual cues are stored at the receiver the display processing is faster, because they aren't compressed, and hence, there are no MPEG buffer-filling, decoding delays.

While the best mode contemplated for practicing the invention has been described in detail, those familiar with the art to which this invention relates will recognize various alternative designs and embodiments for practicing the invention as defined by the following claims.

What is claimed is:

1. A method for perceptibly masking acquisition time after selection of an alternative signal source for reception in an information signal transmission system with a receiver having a source selector, the method comprising:

generating a reduced time response independent of the acquisition time for complete television signals;

portraying a masking visual and/or aural display at said receiver before said acquisition time has expired; and transmitting a simple trigger signal at smaller intervals than said acquisition time period.

2. A receiver for multiple channel signals of an information signal transmission system, the receiver having a channel selector and means for processing the selected channel signal in a discrete acquisition time, the receiver comprising a cueing mechanism for reducing average total perceived acquisition time including:

a generator of a perceptible response within a period less than, and independent of, said discrete acquisition time wherein said generator comprises a trigger enabled periodically within a time interval substantially smaller than said acquisition period; and a displayer for masking said acquisition time by portraying a perceptible response before said acquisition time expires.

3. The invention as described in claim 2 wherein said generator comprises a channel identifier and a cue generator responsive to said identifier.

4. The invention as described in claim 3 and further comprising a spoof signal sender for transmitting a generated cue to a decoder.

* * * * *